(12) United States Patent
Hinton

(10) Patent No.: US 7,416,156 B2
(45) Date of Patent: Aug. 26, 2008

(54) DUAL BRACE-DETERMINATE LANDING GEAR

(75) Inventor: Roland Hinton, Carnation, WA (US)

(73) Assignee: Messier-Dowty (USA), Inc., Kent, WA (US)

( * ) Notice: Subject to any disclaimer, the term of this patent is extended or adjusted under 35 U.S.C. 154(b) by 449 days.

(21) Appl. No.: 11/215,210

(22) Filed: Aug. 30, 2005

(65) Prior Publication Data
US 2006/0237584 A1  Oct. 26, 2006

Related U.S. Application Data

(60) Provisional application No. 60/605,424, filed on Aug. 30, 2004.

(51) Int. Cl.
*B64C 25/10* (2006.01)
(52) U.S. Cl. .................................. 244/102 R
(58) Field of Classification Search ............. 244/102 R, 244/100 R, 102 A, 102 SL, 102 SS
See application file for complete search history.

(56) References Cited

U.S. PATENT DOCUMENTS

| | | | | |
|---|---|---|---|---|
| 2,082,598 A | * | 6/1937 | Saulnler | 244/102 R |
| 2,332,453 A | * | 10/1943 | Martin | 244/102 R |
| 2,360,535 A | * | 10/1944 | Ashton | 91/44 |
| 2,559,451 A | * | 7/1951 | McBrearty | 244/102 R |
| 2,668,030 A | * | 2/1954 | Smith et al. | 244/102 SL |
| 2,939,655 A | * | 6/1960 | Hartel | 244/102 R |
| 2,960,288 A | * | 11/1960 | Hartel | 244/102 R |
| 3,038,687 A | * | 6/1962 | Hartel | 244/102 R |
| 3,356,318 A | * | 12/1967 | Livshits et al. | 244/104 R |
| 4,047,681 A | * | 9/1977 | Hartel | 244/102 SS |
| 4,087,062 A | * | 5/1978 | Masclet | 244/100 R |
| 4,328,939 A | * | 5/1982 | Davies et al. | 244/102 R |
| 4,345,727 A | * | 8/1982 | Brown et al. | 244/102 R |
| 4,392,623 A | * | 7/1983 | Munsen et al. | 244/102 R |
| 4,907,760 A | * | 3/1990 | Sealey et al. | 244/100 R |
| 4,907,761 A | * | 3/1990 | Derrien et al. | 244/102 R |

(Continued)

FOREIGN PATENT DOCUMENTS

EP   0031602 A1   8/1981

(Continued)

*Primary Examiner*—Michael R. Mansen
*Assistant Examiner*—Joseph W Sanderson
(74) *Attorney, Agent, or Firm*—Christensen O'Connor Johnson Kindness

(57) ABSTRACT

Disclosed is an arrangement in which the main landing gear assemblies of a large commercial airplane are each joined to the airplane at four attachment points. Two of the attachment points connect the landing gear side brace and drag brace to the airplane. The two remaining attachment points are aft and forward trunnions that are mounted to the airplane wing. The aft trunnion pivotally connects one side of the landing gear shock strut to the airplane and carries both vertical and torsional loading. The forward trunnion is pivotally connected to the other side of the shock strut by a trunnion link. An actuator is coupled between the shock strut and the trunnion link. When the landing gear is down and locked the actuator is not activated and the trunnion link does not have the rigidity and stiffness required to transfer vertical loads to the forward trunnion. When the actuator is activated, the combination of the actuator and trunnion link rigidly interconnects the shock strut with the forward trunnion so that four point mounting stabilization is present during landing gear retraction, extension and stowage.

4 Claims, 3 Drawing Sheets

U.S. PATENT DOCUMENTS

| | | | | |
|---|---|---|---|---|
| 5,086,995 | A | * | 2/1992 | Large .................... 244/102 R |
| 5,908,174 | A | * | 6/1999 | Churchill et al. ....... 244/102 SS |
| 6,345,787 | B1 | * | 2/2002 | Tighe et al. ............. 244/102 R |
| 6,679,452 | B1 | | 1/2004 | Cottet |
| 6,786,451 | B2 | * | 9/2004 | Courtois et al. ......... 244/102 R |
| 6,796,124 | B2 | * | 9/2004 | Kutlucinar .................. 60/528 |
| 6,805,320 | B2 | * | 10/2004 | Derrien et al. ........... 244/102 A |
| 6,824,100 | B1 | * | 11/2004 | Cheetham ............... 244/102 R |
| 6,938,416 | B1 | * | 9/2005 | Kutlucinar .................. 60/528 |
| 6,942,182 | B2 | * | 9/2005 | Quayle ................... 244/102 R |
| 7,066,429 | B2 | * | 6/2006 | Mellor et al. ........... 244/102 R |

FOREIGN PATENT DOCUMENTS

| | | | |
|---|---|---|---|
| EP | 1016590 | A1 * | 7/2000 |
| EP | 1210265 | B1 | 5/2003 |
| GB | 1239919 | A2 | 7/1971 |
| WO | 82/02180 | A2 | 7/1982 |

* cited by examiner

DUAL BRACE-DETERMINATE LANDING GEAR

CROSS-REFERENCE TO RELATED APPLICATION

This application claims the benefit of U.S. Provisional Application No. 60/605,424, filed Aug. 30, 2004.

FIELD OF THE INVENTION

The present invention relates to airplane landing gear assemblies, and more particularly to main landing gear for large commercial aircraft that is of a statically determinate design.

BACKGROUND OF THE INVENTION

Large commercial jet airplanes typically include two main landing gear assemblies that are attached to the undersides of the wings near the fuselage. When deployed, the landing gear assemblies extend downwardly for supporting the airplane during landings and taxiing. When retracted, the landing gear assemblies are stowed in a wheel well in the airplane fuselage. During normal airplane operations, the landing gear assemblies are subject to several types of mechanical load. For example, when the airplane is stationary or slowing taxiing, the landing gear assemblies must withstand the static weight load of the airplane. The main landing gear assemblies are additionally subjected to large, vertical loads when the airplane touches down on the runway. Large, rearwardly directed drag loads can also be present at touchdown and when the brakes are applied. Further, during steering maneuvers, the landing gear assemblies are subjected to side loads. All of these various loading conditions are reacted by the components of the landing gear and, ultimately, by the landing gear support structures that attach the gear to the airplane. Thus, a considerable amount of design and development effort has been directed to providing landing gear assemblies in which the landing gear load path geometry distributes the loads between the wing and fuselage of the airplane.

One design that has been used to successfully spread the loads between the airplane wing and fuselage uses four discrete attachment points for joining the landing gear assembly to the airplane. Although the use of four attachment points has been successfully used to distribute load in airplanes (such as the Boeing models 767 and 777), the arrangement is subject to a disadvantage and drawback. In particular, because four attachment points are used, the internal loads and attachment loads are statically indeterminate. Thus, the load distribution between the airplane wing and fuselage is a function of the stiffness of the members that join the landing gear to the wing and fuselage. As a result, designing and developing four-point landing gear attachment arrangements can present difficult tasks. In particular, during the design and development of an airplane, changes may be required that may effect the stiffness of the structure used to attach the landing gear to the four attachment points of the airplane. To accommodate these changes, it may be necessary to make changes in the four-point attachment arrangement that add additional weight or, in an extreme case, a redesign could be required.

A further design consideration is that the main landing gear of large commercial airplanes is designed to breakaway from the airplane under severe overload conditions, such as off-runway excursions, high sink rate landings, etc., so that the gear will not break open fuel tanks that are contained in the wings. In some arrangements, the trunnion attachment used to join the landing gear with the airplane is very stiff as a result of a cantilever trunnion support. In such an arrangement, the trunnions typically carry very high loads, thus requiring that the trunnion pins be high strength fuse links in order to achieve landing gear breakaway. The very large design loads that result from the use of high-strength fuse pins can present disadvantages with respect to the necessary size of the airplane wing box.

SUMMARY OF THE INVENTION

In accordance with this invention, a main landing gear assembly is attached to the airplane at four points. A folding drag brace and a folding side brace extend between the landing gear shock strut and the airplane wing and fuselage structure in a conventional manner to form two of the landing gear attachment points. The other two attachment points are aft and forward trunnions that are located on a cantilever support that extends from the rear wing spar. In the currently preferred embodiment of the invention, the aft trunnion provides an attachment for a trunnion lug that longitudinally extends from the upper end of the landing gear shock strut. The forward trunnion is spaced apart from the upper end of the shock strut and pivotally receives one end of a trunnion link. The other end of the trunnion link is pivotally connected to a trunnion that extends radially from the upper end of the landing gear shock strut. An actuator extends between the upper portion of the shock strut and the central region of the trunnion link. In the currently preferred embodiment, one end of the actuator is trunnion mounted to the shock strut directly below the trunnion link and the other end is trunnion mounted to the central region of the trunnion link. In operation, the actuator serves to, in effect, lock and unlock the forward trunnion arrangement so that the landing gear has three attachment points when the side brace and drag brace are in their locked position, i.e., when the landing gear is down and locked, and in effect, has four attachment points during deployment, retraction and stowage. Thus, when the aircraft is landing and is on the ground, vertical load is transferred to the airplane through the aft trunnion, with the forward trunnion reacting at least almost entirely to torsional loads. Accordingly, from the standpoint of primary design considerations, the landing gear employs a three-point attachment system that is statically determinate. As is known in the art, the invention thereby provides design predictability and repeatability in manufacturing that is not subject to the stiffness of the attachment components which can be difficult to determine and which can change significantly with changes that occur in the design and development of an airplane.

On the other hand, the actuator, in effect, locks the trunnion link to the aft trunnion whenever the landing gear drag brace and side brace are not locked. Thus, there are four main landing gear attachment points to stabilize the gear when it is stowed in the wheel well or is being extended or retracted.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
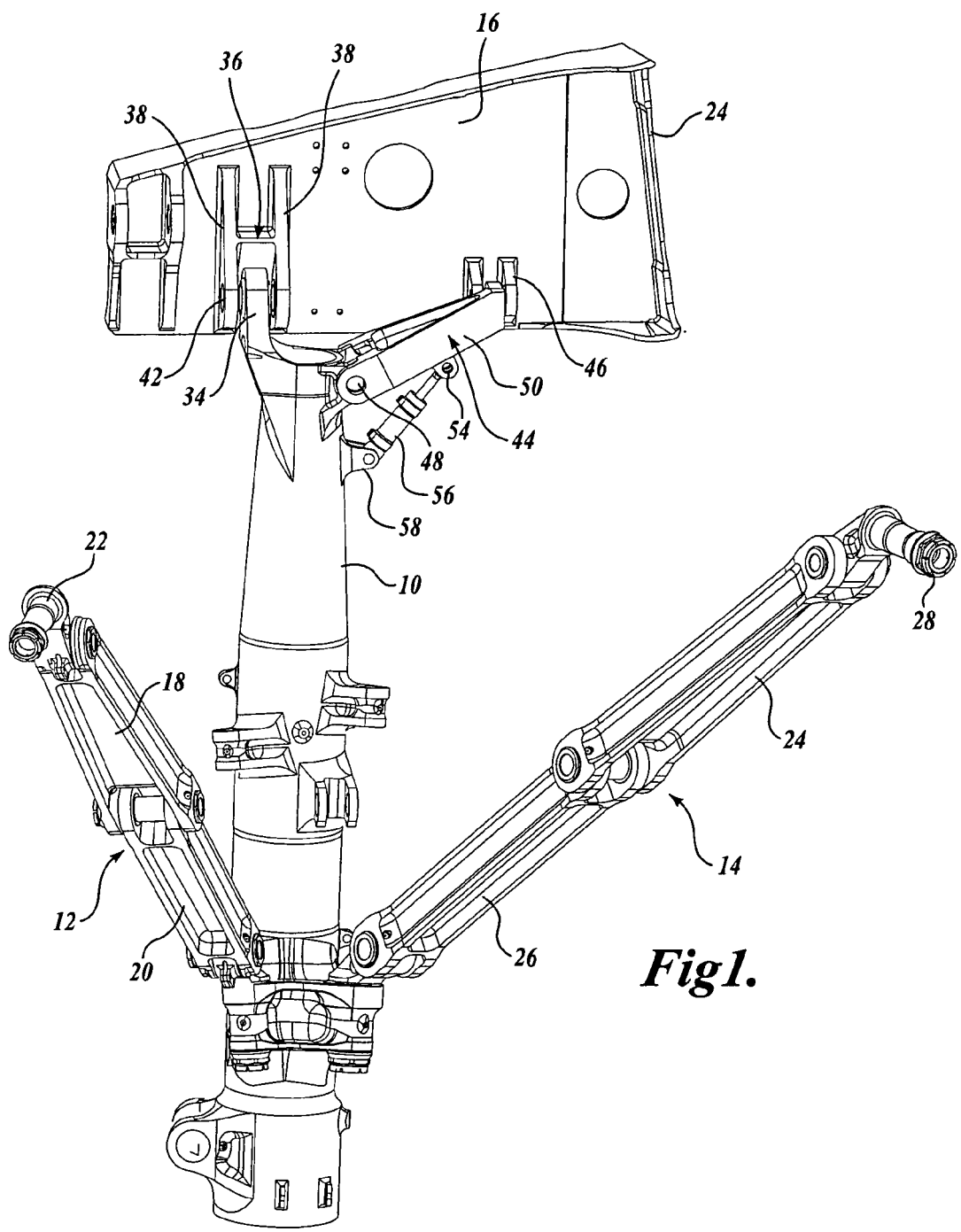
FIG. 1 is a perspective view of the upper portion of a main landing gear that is configured in accordance with the invention for locking and unlocking on of the two trunnions that couple the upper end of the shock strut to the airplane wing structure.

The upper portion of a main landing gear that is configured in accordance with this invention is shown in FIG. 1. The depicted components include a shock strut 10, a side brace 12, a drag brace 14, and a cantilever support 16 for attaching the upper end of the shock strut 10 to the airplane employing the depicted main landing gear. In FIG. 1, the depicted main landing gear is on the left-hand side of an airplane with the view being generally in the outboard direction.

Various main landing gear components that are conventional in type and arrangement are not shown in FIG. 1. For example, as is known in the art, a landing wheel truck having an appropriate number of wheels and tires is journaled to the lower end of the shock strut 10. Also not shown in FIG. 1, are the mechanisms for locking the side brace 12 and drag brace 14 when the main landing gear is down and locked (i.e., when the shock strut 10 extends downwardly as depicted in FIG. 1).

As can be seen in FIG. 1, the landing gear of the invention is attached to the airplane at four points, two of which are provided by side brace 12 and drag brace 14 with the two remaining attachment points joining the upper end of shock strut 10 to a cantilever support 16 that extends in the aft direction from the rear spar 24 of an airplane employing the invention.

In the arrangement shown in FIG. 1, side brace 12 is constructed and arranged in a conventional manner. Specifically, side brace 12 includes an upper link 18 and a lower link 20 that are journaled together for alignment with one another when the landing gear is deployed and so that the upper and lower links swing into a folded condition when the landing gear is retracted and stowed. To allow the required movement of side brace 12 between the landing gear down and stowed positions, the lower terminus of side brace lower link 20 is journaled to shock strut 10. Located at the upper terminus of side brace 12 is a conventionally configured attachment link 22. Attachment link 22 is joined to an appropriate attachment point of the airplane so that adequate reaction to landing gear side forces is provided during landing and taxiing maneuvers that are within the airplane design range.

Drag brace 14 also is of conventional type and function. Like side brace 12, drag brace 14 includes journaled together upper and lower links 24 and 26, respectively, with the lower terminus of drag brace lower link 26 being journaled to shock strut 10 so that the upper and lower links 24 and 26 can be locked down in alignment with one another when the landing gear is deployed and folded with respect to one another during retraction, stowage, and deployment. As also is the case with respect to side brace 12, the upper terminus of drag brace upper link 24 includes an attachment link 28. As is known in the art, attachment link 28 of drag brace 14 attaches drag brace 14 to the appropriate part of the airplane so that drag brace 14 reacts to fore and aft loading that is encountered during landing and taxiing operations that are within the airplane design range.

Having described two of the landing gear attachment points, reference is now taken to the interconnection of the upper end of shock strut 10 with cantilever support 16.

In the depicted arrangement, an attachment lug 34 is integrally formed at the upper end of shock strut 10, extending longitudinally therefrom and being in a plane that is substantially parallel to a plane that includes the longitudinal center line of shock strut 10. Attachment lug 34 passes between the parallel, spaced apart bearing arms 38 of an aft trunnion 36. Similar arrangements are known in the art for joining the upper end of a landing gear shock strut to the wing of an airplane. For example, in one relatively common arrangement, two parallel, spaced apart attachment lugs extend longitudinally from the upper end of a landing gear shock strut with the spaced apart lugs being rotatably joined with appropriately positioned trunnions. As is known in the art, in such arrangements, a trunnion pin passes through the spaced apart trunnion bearing arms and a suitable opening in the shock strut attachment lug. In the arrangement of FIG. 1, trunnion pin 42 preferably is a fuse pin (i.e., a pin that shears when subjected to a predetermined force). As shall be described in additional detail, employing a fuse pin as the trunnion pin 42 of aft trunnion 36, is one of the features that can be incorporated in the invention to provide landing gear breakaway under load conditions that exceed the design capability of the airplane (e.g., off runway excursions, excessive sink rate landings, etc.)

Figure 2:
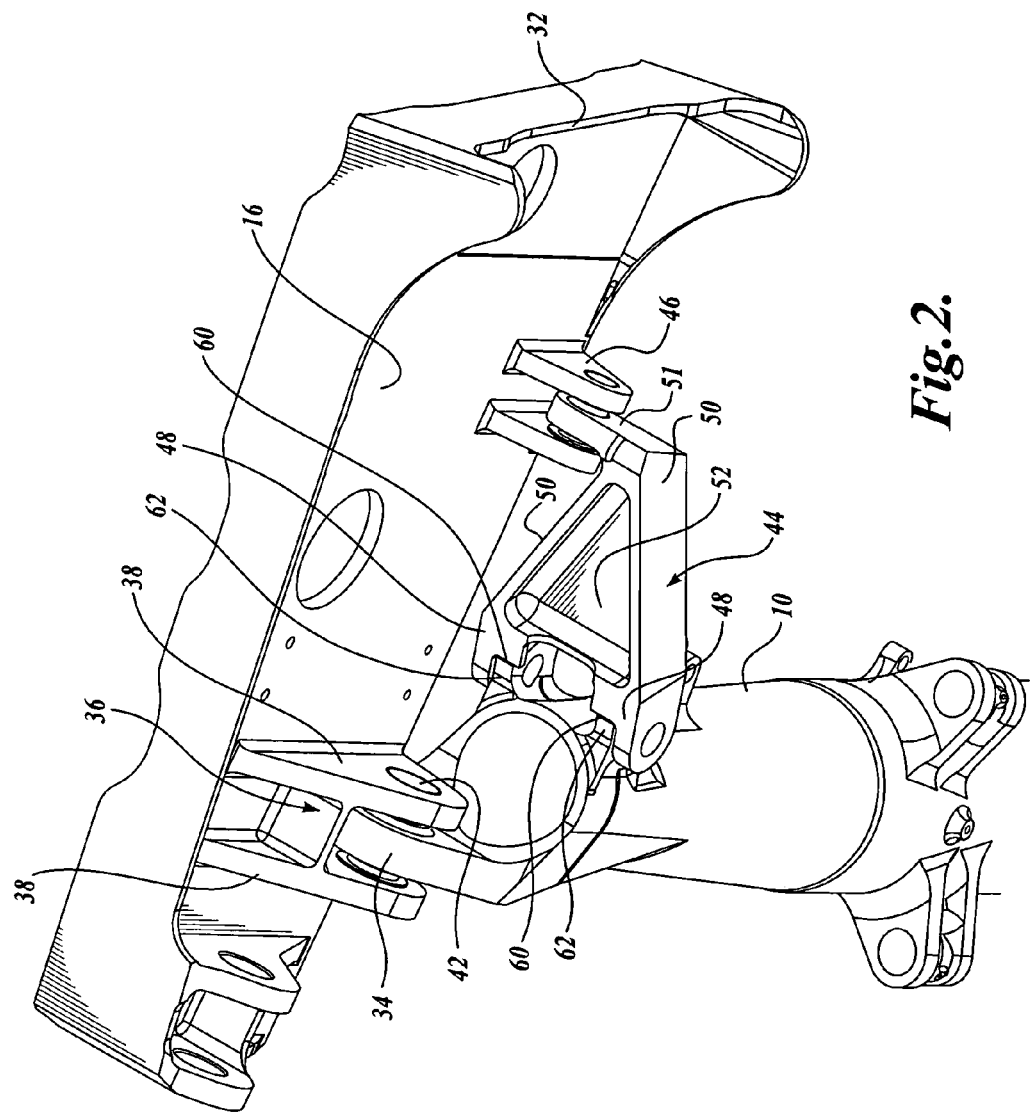
FIG. 2 is a partial perspective view of the upper end of the landing gear shock strut looking downwardly and outwardly to further illustrate attachment of the shock strut to a wing cantilever support.

The upper end region of shock strut 10 that is diametrically opposed to shock strut attachment lug 34 is attached to cantilever support 16 by means of a trunnion link 44. As is best seen in FIG. 2, the end of trunnion link 44 that is located adjacent the upper end of shock strut 10 includes two spaced apart lugs 48 that include openings for pivotally mounting trunnion link 44 to shock strut 10. In the arrangement of FIG. 2, the trunnion link lugs 48 are positioned adjacent spaced apart lugs that are integrally formed in shock strut 10 and project in the forward direction relative to the airplane. As also is shown in FIG. 2, trunnion link 44 includes two sidewalls 50 that converge inwardly to form the forward terminus of trunnion link 44. Extending from the forward terminus of trunnion link 44 and toward cantilever support 16 is a lug 51 for pivotally connecting trunnion link 44 with a forward trunnion 46 that is integrally formed in cantilever support 16. As can be seen in both FIGS. 1 and 2, aft trunnion 36 and forward trunnion 46 are in alignment with one another to allow shock strut 10 (and hence the landing gear) to be swung between a down and locked position and a stowed position.

Continuing with the description of trunnion link 44, a relatively thin web 52 spans the substantially "V-shaped" region defined between trunnion link sidewalls 50. As is best seen in FIG. 1, a small trunnion 54 extends downwardly from the central region of trunnion web 52. Extending between trunnion 54 and a small trunnion 58 that is located on shock strut 10 is an actuator 56.

Trunnion link 44 and actuator 56 are configured and arranged to function in a manner that effectively attaches the gear assembly to the airplane at three points when the landing gear is down and locked and attaches the landing gear at four points when the landing gear is being deployed, retracted, or is stowed in the wheel wells. In this regard, when the landing gear assembly of FIG. 1 is down and locked, the vertical loads are transferred to aft trunnion 36 by means of shock strut 10. However, as will be described below, with the gear down and locked, trunnion link 44 carries loads from torsion that is applied to the landing gear, but transfers substantially no vertical loads to forward trunnion 46 and cantilever support 16. Thus, when the gear is down and locked, three point attachment is achieved. On the other hand, when the gear is not down and locked (during deployment, retraction and storage), actuator 56 causes trunnion link 44 to assume a condition under which trunnion link 44 transfers loads that would be vertical loads if the airplane were landing or taxiing. (The gear is in a state equivalent to four point attachment) As previously mentioned, this allows stabilization of the landing gear during gear extension, retraction, and stowage (i.e., at all times when side brace 12 and drag brace 14 are unlocked). As also mentioned, because the landing gear uses three attachment points during touchdown, and at all times the airplane is on the ground, the main landing gear interface loads are statically determinant and predictable, which is highly advantageous from the standpoint of airplane design and development. Moreover, in the arrangement of the invention, a single trunnion attachment carries the vertical load (e.g., aft trunnion 36 in the arrangement of FIG. 1) which means that a single fuse pin can be used to provide landing gear breakaway under vertical overload conditions (e.g., significantly excessive sink rate at touchdown).

The manner in which trunnion link 44 and actuator 56 implement the "locked" and "unlocked" trunnion conditions is as follows. Trunnion link 44 is designed so that, standing alone, it will not transfer vertical loads from shock strut 10 to forward trunnion 46 (and hence, the airplane wing structure). However, when actuator 56 is activated to rigidly extend between shock strut 10 and trunnion link 44, axial loading of shock strut 10 (vertical loading if the gear is down and locked) is transferred to forward trunnion 46 (and hence, the airplane wing structure). Thus, by maintaining actuator 56 in a deactivated state when the landing gear is down and locked (e.g., when the side brace 12 and drag brace 14 are locked), only landing gear pivot torque is transferred to forward trunnion 46. On the other hand, activating actuator 56 when the landing gear is not down and locked (e.g., when side brace 12 and drag brace 14 are unlocked) forms a rigid interconnection between the upper end of shock strut 10 and forward trunnion 46. In effect, the landing gear then becomes a four point attachment arrangement. More importantly, rigidly interconnecting the upper end of shock strut 10 with forward trunnion 46 provides structural stability to the landing gear that is required in order to swing the landing gear between the gear down and gear up configurations against various forces such as wind forces that tend to push the gear back toward the stowed position during gear deployment.

Those of ordinary skill in the art will recognize that various arrangements can be used as actuator 56 to establish stable structure when the gear is not down and locked. For example, a positioning actuator similar to those used for positioning a landing gear truck can be used, as can a hydraulic lock, an air spring, or a mechanical stop arrangement similar to side and drag brace locking mechanisms. Those skilled in the art will also recognize that other arrangements can be used to provide a mechanism that is operationally equivalent to the combination of trunnion link 44 and actuator 56. In that regard, structure equivalent to trunnion link 44 can be configured in various manners as long as that structure physically couples the upper end of shock strut 10 to trunnion 46 and, in addition, lacks rigidity or stiffness that is required in order to transfer vertical loads to trunnion 46 when the landing gear is down and locked. In such an arrangement, actuator 56 can be replaced by mechanical linkage, or hydraulically or pneumatically operated mechanisms that extend between the upper region of shock strut 10 and any portion of the structure that substitutes for trunnion link 44 (or even forward trunnion 46 or cantilever support 16) as long as the mechanism equivalent to actuator 56 structurally locks shock strut 10 to forward trunnion 46 when the landing gear is not down and locked.

Figure 3:
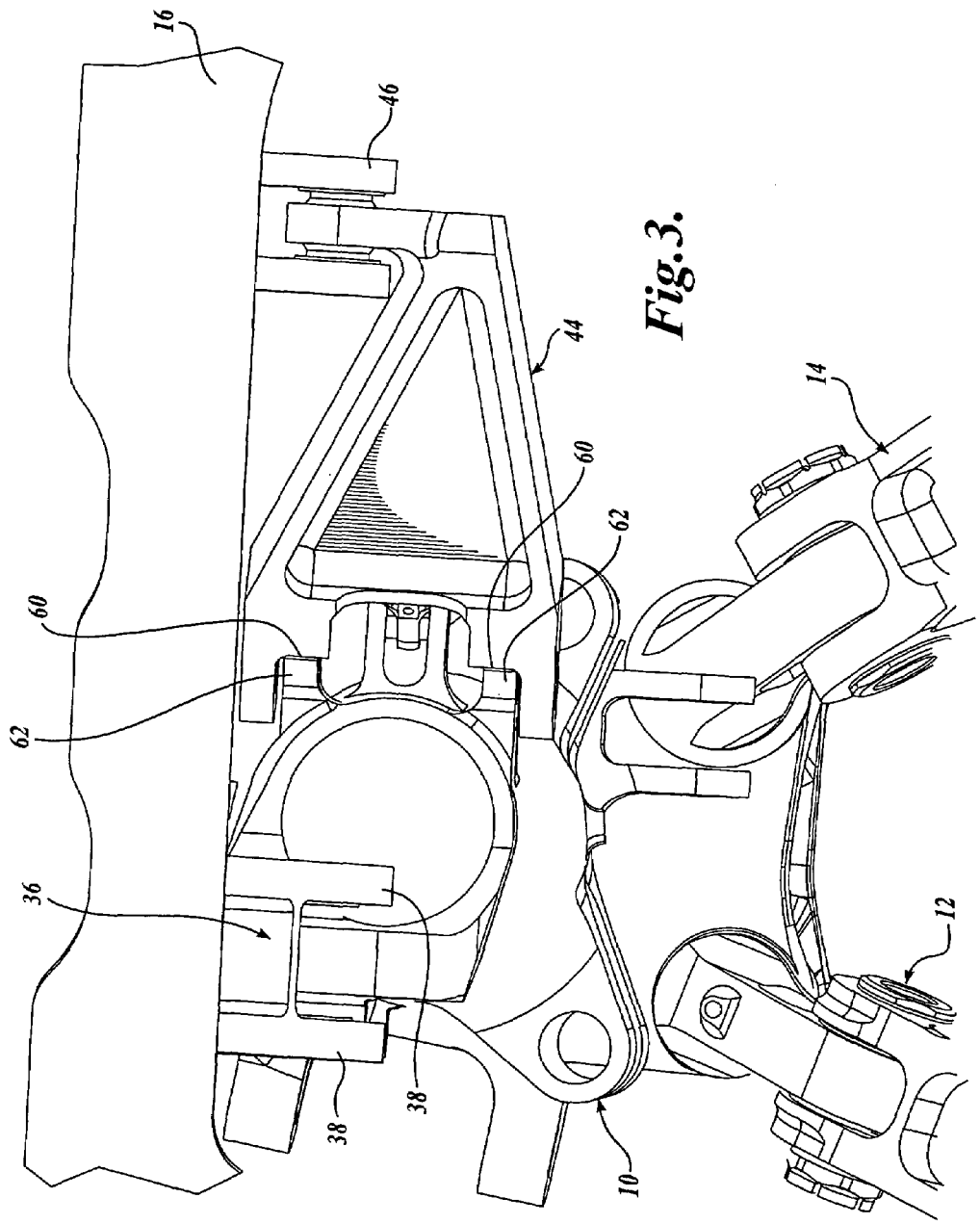
FIG. 3 is an enlarged view of the mounting arrangement between the end of the trunnion link and its mounting that is located at the upper end of the shock strut to show features of the trunnion link that relate to failure of the forward trunnion during landing gear breakaway.

As previously mentioned relative to the arrangement shown in FIGS. 1 and 2, landing gear breakaway is facilitated by the use of a fuse link as trunnion pin 42, which joins shock strut attachment lug 34 to aft trunnion 36. FIGS. 2 and 3 depict additional features of the currently preferred embodiment of the invention relative to providing landing gear breakaway. In that regard, in order for the gear to breakaway from the airplane, failure must be induced in both aft trunnion 36 and forward trunnion 46. In the arrangement depicted in FIGS. 2 and 3, failure of the forward trunnion joint is achieved by configuring the trunnion link lugs 48 with inwardly extending stops 60 that are forced against stop surfaces 62 that are included in the lugs of shock strut 10 that pivotally attach shock strut 10 to trunnion link 44. This arrangement short couples the pin that attaches trunnion link 44 to shock strut 10 which causes trunnion link 44 to break at the pin location due to excessive rotation at aft trunnion 36 that occurs under breakaway conditions.

With the arrangements shown in FIGS. 2 and 3 arranged in the described manner, a vertical overload that causes the landing gear to breakaway first fuses the aft trunnion pin 40 and then causes the forward trunnion joint to fail. With respect to landing gear breakaway caused by drag overload, the breakaway sequence is: a fuse pin that is installed in the conventional manner in the drag brace fails; the forward trunnion attach pin fails as described above; and the aft trunnion lug then fails due to excessive gear rotation and the landing gear assembly collapses.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. An airplane main landing gear assembly moveable between a retracted stowed position and a down and locked position, said landing gear assembly having four mounting members for attaching the landing gear assembly to the airplane, each of said mounting means being attached to the airplane by an associated attachment fixture, said main landing gear assembly comprising:

a shock strut having a first end and a second end, said shock strut extending in a substantially vertical direction when said landing gear is down and locked, said first end of said shock strut being pivotally attachable to a landing gear wheel and tire assembly;

a foldable drag strut for forming the first mounting member of said four mounting members, said foldable drag strut having first and second ends, the first end of said drag strut being pivotally attached to said shock strut, said second end of said foldable drag strut being adapted for pivotal attachment to said attachment fixture that is associated with said first mounting member;

a foldable side strut for forming the second one of said four mounting members for attachment of the landing gear assembly to the airplane, said foldable side strut having first and second ends, the first end of said foldable side strut being pivotally attached to said shock strut, said second end of said side strut being adapted for pivotal connection to said attachment fixture that is associated with said second mounting member;

a mounting lug extending longitudinally from the second end of said shock strut, said mounting lug being dimensioned and arranged for trunnion mounting one side of said second end of said shock strut to said airplane, said shock strut and said lug transferring vertical and torsional forces to said airplane when the airplane touches down during a landing procedure and when the airplane is on the ground;

a trunnion link, said trunnion link having first and second ends, the first end of said trunnion link being pivotally mounted to the second end of said shock strut at a position that is oppositely disposed to the location of said mounting lug, said second end of said trunnion link being dimensioned and arranged for trunnion mounting to the airplane, the stiffness and rigidity of said trunnion link being insufficient for transferring vertical loads to the airplane at landing touchdown and when the airplane is on the ground, but being sufficient to transfer torsional forces to the airplane; and an actuator operatively interconnected with said trunnion link, said actuator operable to increase the stiffness and rigidity of said trunnion link when said landing gear assembly is not down and locked to thereby provide structural stabilization of said landing gear assembly during extension, retraction and stowage.

2. The landing gear assembly of claim 1 further comprising a cantilever support that extends from a rear spar of a wing of the airplane said cantilever support including an aft trunnion and a forward trunnion, said aft trunnion for receiving said mounting lug of said shock strut and having a trunnion pin for rotatably securing said mounting lug in said aft trunnion, said forward trunnion being aligned with and spaced apart from said aft trunnion, said forward trunnion for receiving said second end of said trunnion link.

3. The landing gear assembly of claim 2 wherein said trunnion pin of said aft trunnion is a fuse pin that causes separation of said mounting lug of said shock strut from said aft trunnion during landing gear breakaway.

4. The landing gear assembly of claim 3 wherein said shock strut and said first end of said trunnion link each include a pair of spaced apart mounting lugs, each mounting lug of said trunnion link and each lug of said shock strut including a central opening for receiving a mounting pin, each mounting lug of said trunnion link being positioned alongside a lug of said shock strut with said central openings being in alignment with one another and being rotatably interconnected by a mounting pin;

each said lug of said trunnion link and said lug of said shock strut including stop surfaces that are forced together when said trunnion link reaches a predetermined pivotal position, continued pivotal movement of said trunnion link that is encountered under overload conditions causing said trunnion link to break free of said shock strut.

* * * * *